Jan. 9, 1968  RISABURO TAKAHASHI  3,362,539
CELLULOSE FILTER APPARATUS
Filed March 10, 1966  2 Sheets-Sheet 1
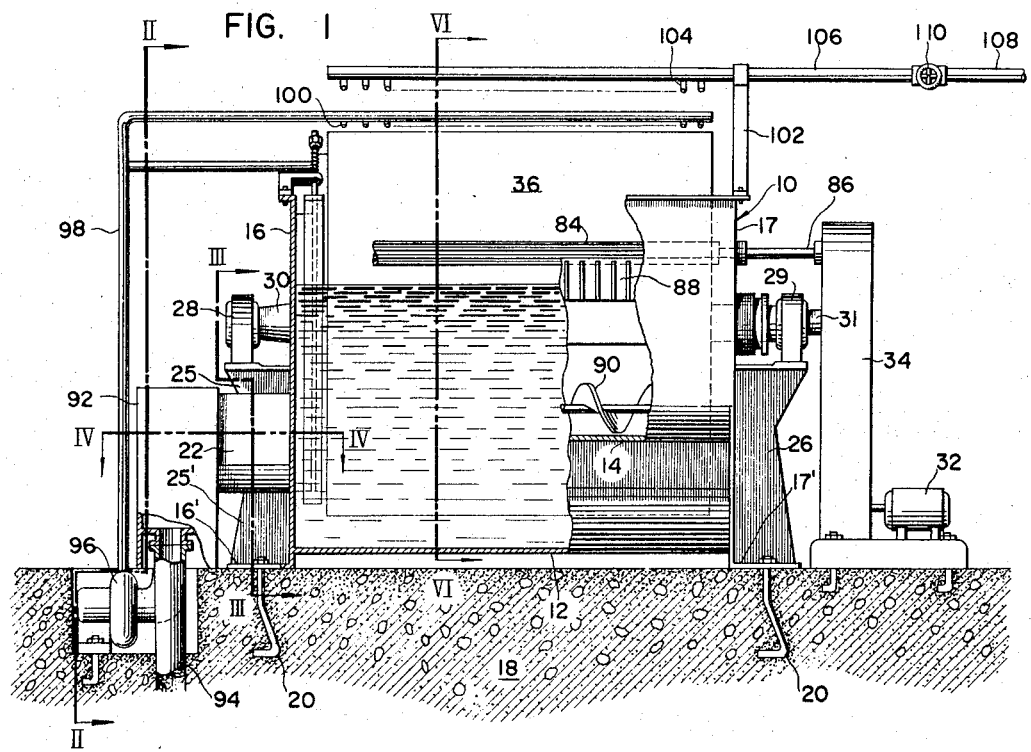
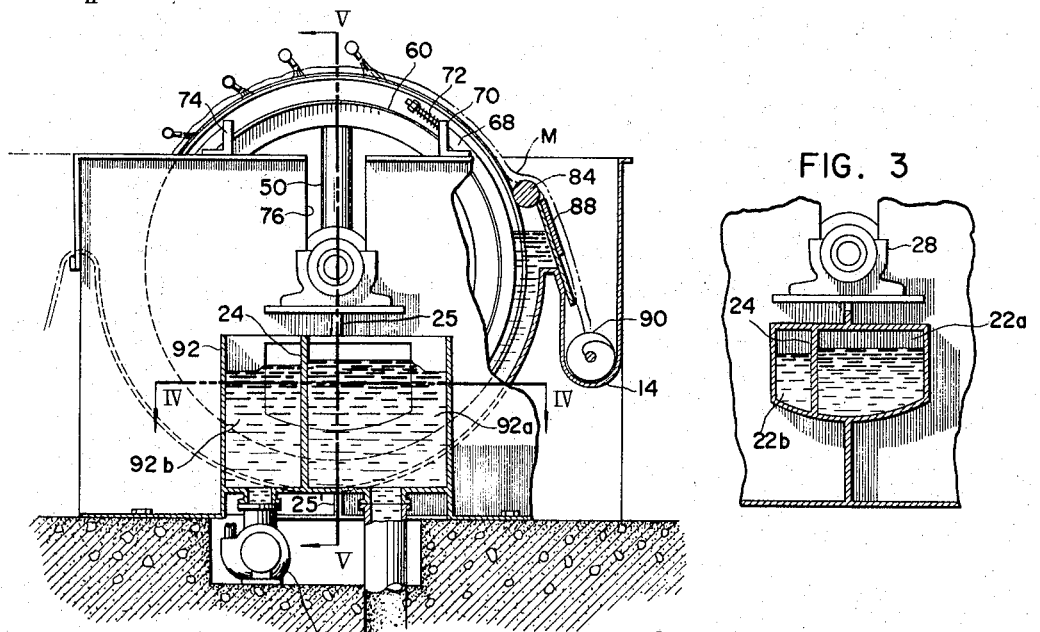
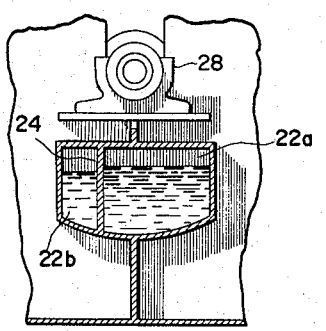

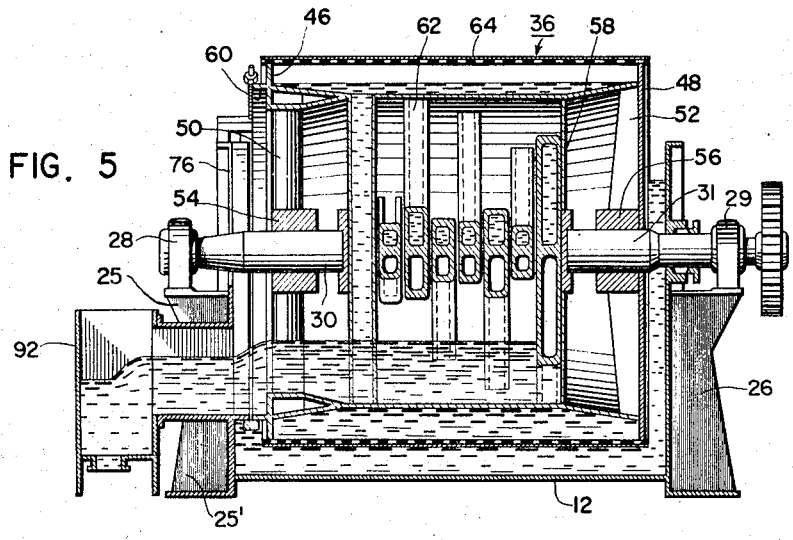
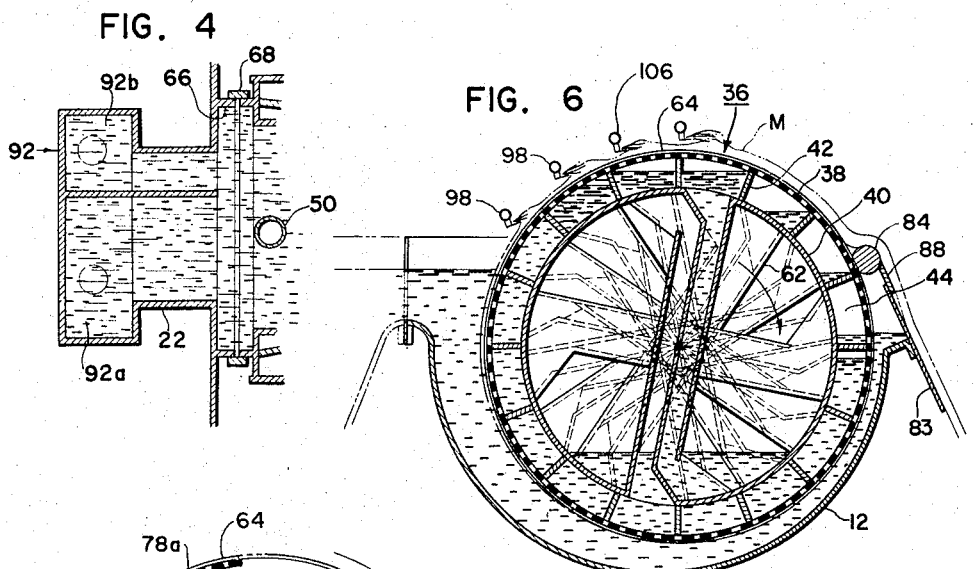
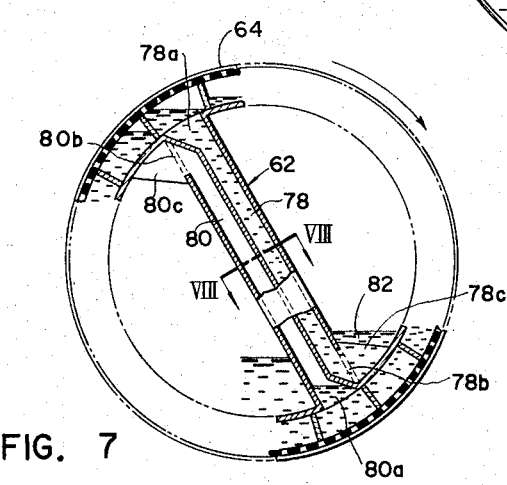
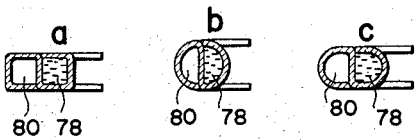

United States Patent Office 3,362,539
Patented Jan. 9, 1968

3,362,539
CELLULOSE FILTER APPARATUS
Risaburo Takahashi, Yoshihara, Japan
(2165 Miyagawa-cho, Fuji, Shizuoka, Japan)
Filed Mar. 10, 1966, Ser. No. 533,202
3 Claims. (Cl. 210—217)

ABSTRACT OF THE DISCLOSURE

This invention comprises a rotary filter drum rotatably horizontally supported in a vessel and including a plurality of longitudinal compartments formed between a pair of outer and inner coaxial cylindrical shells with the outer shell having a multiplicity of filtering perforations while the inner shell has an open end and a closed end. A pair of diametrically opposed compartments are operatively connected to one twin discharge tube diametrically spanning the interior of the inner shell such that a pair of parallel juxtaposed discharge channels within the tube communicate at one end with the compartments and are open at the other ends into water seal spaces defined by the side walls of the tube and the adjacent portions of the internal shell surface. The twin discharge tubes are disposed side-by-side in angularly offset relationship. The limited length of the discharge tube causes a maximum water leg. The discharge is rectilinearly effected and hence at a high speed. This allows the discharge tube to be small leading to saving the tube material. Also the tubes pass through the central line of the drum resulting in an increase in its strength.

---

This invention relates to a filter apparatus including a rotary filter drum for filtering cellulose materials.

The conventional type of cellulose filter apparatus includes a rotary filter drum, the lower half of which is immersed in a liquid cellulose suspension to be treated within a vessel, wherein during rotational movement of the drum a difference between pressures on the outside and inside of the rotating drum is utilized to pass only the liquid portion of the suspension through the filter wall of the drum from the outside to the inside of the drum while the cellulose portion of the suspension adheres in the form of a layer or a mat to the outer periphery of the drum. The layer of cellulose material is moved along with the rotating drum until it reaches a stripping roller contacting the drum and serving to strip the cellulose mat from the drum and for feeding it into the succeeding treatment step. Under these circumstances, the stripping roller is preferably positioned at a level as low as possible with respect to the drum and higher than the level of the suspension in the vessel, for the purpose of facilitating stripping of the cellulose mat from the drum. However, it is not desirable to position the stripping roller too low because of the reverse flow of the filtrate, that is, because some of filtrate flows from the inside to the outside of the drum. Where a liquid cellulose suspension has a low concentration, the conventional type of cellulose filter apparatus is disadvantageous in that the resulting cellulose mat on the rotating drum is very difficult to strip from the drum because the cellulose mat left on the drum is thin and also because the cellulose mat is not sufficiently dewatered upon reaching the stripping roller.

Accordingly, a general object of the invention is to eliminate the abovementioned disadvantages.

An object of the invention is to provide an improved cellulose filter apparatus wherein a filtrate is prevented from flowing from the inside to the outside of the rotating drum involved even when it is in a position relatively low with respect to the longitudinal axis of the drum and wherein dewatering can be performed over a wide angle of rotation of the drum to permit the associated stripping roller to be positioned at a lower level than in the prior art practice whereby a thin sheet of cellulose deposited from a liquid cellulose suspension upon the rotary drum can readily be stripped from the latter.

Another object of the invention is to provide an improved cellulose filter apparatus which is simple in construction and hence easily manufactured at low cost as well as having a high strength.

A further object of the invention is to provide an improved cellulose filter apparatus including means for dividing a waste liquid discharged from a rotating drum into two liquid portions having a low and a high concentration respectively thereby to facilitate treatment of the waste liquid.

A still further object of the invention is to provide an economical cellulose filter apparatus as described in the preceding paragraph wherein the portion of the waste liquid lower in concentration is utilized as a washing water which is sprinkled over a cellulose mat deposited on the rotating drum for the purpose of minimizing the amount of water used.

The invention will become more readily apparent from the following description taken in conjunction with the accompanying drawings in which:

FIG. 1 is an elevational view of a cellulose filter apparatus constructed in accordance with the teachings of the invention with portions cut away for clarifying the internal construction;

FIG. 2 is a sectional view taken along the line II—II of FIG. 1;

FIG. 3 is a sectional view taken along the line III—III of FIG. 1;

FIG. 4 is a sectional view taken along the line IV—IV of FIG. 1;

FIG. 5 is a sectional view taken along the line V—V of FIG. 2;

FIG. 6 is a sectional view taken along the line VI—VI of FIG. 1;

FIG. 7 is a fragmental sectional view of a filter drum illustrated in FIG. 6; and FIGS. 8a, b and c are sectional views of various modifications of the invention taken along the line VIII—VIII of FIG. 7.

Referring now to the drawings and more particularly to FIGS. 1 and 2, there is illustrated a rotary drum filter apparatus constructed in accordance with the teachings of the invention. The arrangement illustrated comprises a substantially semi-cylindrical vessel generally designated by the reference numeral 10 and made of a stainless metal such as a stainless steel. The vessel 10 includes a substantially semi-cylindrical wall plate 12 for forming a space within which a rotary filter drum as will be described hereinafter is accommodated, a wall plate 14 connected integrally to the wall plate 12 to form a J- or U-shaped space having a size less than and extending parallel to the first-mentioned space, and a pair of opposed parallel end plates 16 and 17 for closing both ends of the wall plates 12 and 14. The vessel 10 is rigidly secured on a foundation 18 by a pair of flanges 16' and 17' formed on the bottoms of the end plates 16 and 17 and a plurality of stud bolts 20 as shown in FIG 1.

The end plate 16 is provided on the lower portion with an outlet to which a waste duct 22 is connected. The waste duct 22 includes a longitudinal partition 24 dividing the same into a pair of adjacent duct portions 22a and b extending through the adjacent portion of the end plate 16 and communicating with a lower portion of the interior of the vessels 10 as shown in FIGS. 1 through 4. Disposed above and below the waste duct 24 is a pair of upper and lower ribs 25 and 25' respectively cooperating with the duct to reinforce the end plate 16.

As shown in FIG. 1, the end plate 17 is provided on the lower portion of the outer surface with a rib 26. The upper rib 25 connected to the end plate 16 and the rib 26 connected to the end plate 17 have disposed thereon a pair of bearing units 28 and 29 for journalling a pair of shafts 30 and 31 in liquid-tight relationship with respect to the vessel for the purpose which will be apparent hereinafter.

One of the shafts 31 is adapted to be driven by a drive such as an electric motor 32 disposed on the foundation 18 through a reduction gearing 34, at a relatively low speed in the clockwise direction as viewed in FIG. 2.

Referring now to FIGS. 5 and 6, there is illustrated a rotary filter drum constructed in accordance with the teachings of the invention. The rotary filter drum generally designated by the reference numeral 36 comprises an outer cylindrical shell 38 made for example of a stainless steel and having a multiplicity of small openings or perforations, an inner cylindrical shell 40 disposed coaxially within the outer shell to form an annular space, and a plurality of axial parallel partitions 42 for dividing the annular space into a plurality of longitudinally elongated compartments 44. That common end of the compartments 44 near to the waste duct 22 is closed with an annular end plate 46 and the opposite common end of the compartments and the corresponding ends of the outer and inner shells 38 and 40 are closed with a circular end plate 48. In other words, the filter drum 36 is open at one end and closed at the other end. A plurality of radial arms 50 and 52 connect the end portion of the internal peripheral wall of the inner shell 40 to respective hubs 54 and 56 mounted on the associated shaft 30 and 31 respectively. Adjacent that end of the inner shell 40 at which the end plate 48 is disposed and slightly spaced from the latter is a circular plate 58 rigidly secured to the internal peripheral surface of the inner shell 40. The annular end plate 46 has a flange 60 in the form of a short cylinder extending outwardly from the internal peripheral edge. A plurality of substantially diametric tubes or channels 62 as will be described hereinafter are disposed within and along substantially the whole length of the inner shell 40 for a purpose as will be apparent. Further the filter drum 36 has a sheet of detachable filter cloth 64 completely wrapped around the outer shell 38.

As shown in FIGS. 1, 4 and 5, the end plate 16 is provided on the inside with a flange in the form of a short segmental cylinder 66 substantially equal in diameter to the flange 60 and disposed oppositely to the latter such that the flange 66 surrounds the opening of the waste duct 22. In order to seal a space formed between at least those portions of opposing flanges 60 and 66 disposed within the vessel 10, a soft water-tight packing ring 68 is carried by a bracket 70 secured on the upper edge of the end plate 16 and maintained in a tensioned state by having at least one end connected to a spring 72. The belt 68 has the other end connected to a bracket 74 also secured to the upper edge of the end plate 16 as shown in FIG. 2. It will be appreciated that the arrangement of packing belt 68 and the flanges 60 and 66 ensures that liquid on each of the internal and external sides of the drum is prevented from entering the other side of the drum through the space formed between the flanges. This allows the liquid outside the drum or within the vessel to rise to a level higher than the bottom of a vertical notch 76 formed on the end plate 16 above the bearing device 28 as shown in FIG. 2.

Each of the discharge tubes 62 is shown in FIGS. 6 through 8 as being a twin tube including a pair of parallel channels 78 and 80 and may be made by processing a sheet of stainless metal such as stainless steel into a closed S-shaped cross section to form the pair of parallel channels. The pair of channels 78 and 80 has a common wall lying in one diametric plane for the internal drum shell 40 and firmly secured to the internal surface of the latter for example by welding with one end 78a or 80a opening into an associated compartment 44 the two compartments being diametrically opposed. As best shown in FIG. 7, the discharge channel 78 or 80 is provided on the other end portion with a discharge port 78b or 80b in the side wall thereof and directed in a direction opposite to the direction of rotation of the filter drum 36 and is also provided with a radial baffle plate 78c or 80c projecting from the rear wall portion (which is remote from the open end of the drum) as viewed in FIG. 7 or the righthand wall portion as viewed in FIG. 5 to the adjacent portion of the internal surface of the inner drum shell 40 to which it is rigidly secured for example by welding.

The baffle plate 78c or 80c extends toward the central line of the drum slightly beyond that end of the discharge port 78b or 80b near to that central line and defines with that portion of the internal surface of the inner drum shell 40 facing the port a liquid seal space 82 as will be fully described hereinafter.

As shown in FIGS. 5 and 6, each pair of adjacent discharge tubes 62 are connected to each other so as to cross each other at their common center at substantially right angles for example by welding and a plurality of such tube pairs are welded to the internal surface of the inner drum shell 40 in angularly offset relationship.

In the embodiment illustrated, the annular space formed between the outer and inner drum shells 38 and 40 is divided into 16 compartments 44 by the longitudinal partitions 42 and 8 twin tubes 62 are provided to communicate the associated pair of compartments 44 which are diametrically oppositely disposed with the interior of the inner drum shell 40. However, it is to be understood that the compartments and the twin tubes may vary in number from those shown, if desired.

In addition, the discharge channel may be of any desired cross section. For example, FIG. 8a shows a square cross section, FIG. 8b a semicircular cross section and FIG. 8c a semi-elliptic cross section.

As shown in FIGS. 2 and 6, a partition 83 is disposed between the semi-cylindrical wall plate 12 and the J- or U-shaped wall plate 14 so as to extend above the liquid level in the vessel. Immediately above the partition 83 is a fluted stripping roll 84 in a position where the roll almost contacts the outer drum shell 38. The stripping roll 84 is adapted to be driven by a shaft 86 (FIG. 1) which is one of the output shafts of the reduction gearing 34 in the clockwise direction as viewed in FIG. 2.

In order to allow a cellulose mat produced on the outer periphery of the rotating filter drum 36 and stripped from the latter by the stripping roll 84 in the manner as will be described hereinafter to fall easily, a tilted plate 88 having a plurality of ridges (see FIG. 1) formed thereon is disposed on the upper portion of the partition 83 such that the plate contacts the stripping roll in approximately line contact.

Disposed below the tilted plate 88 or on the bottom of the J- or U-shaped wall plate 14 is a screw feeder 90 serving to crush the portion of the cellulose mat which has fallen thereupon while at the same time feeding the crushed mat into the succeeding treating step. The feeder 90 may be driven through the reduction gearing 34 or by a separate drive (not shown).

As shown in FIGS. 1 and 4, the waste duct 22 having one end communicating with the interior of the filter drum 36 has the other end communicating with a filtrate box 92 including a pair of spaces 92a and b separated by an extension of the partition 24 disposed within the waste duct. As shown in FIGS. 1 and 2, both spaces 92a and b in the filtrate box 92 are upwardly open and have the respective bottoms operatively connected to an exhaust pipe 94 and a circulation pump 96. The pump 96 serves to pump a filtrate as will be described hereinafter into a pipe 98 which is, in turn, connected to a plurality of spaced nozzles 100 disposed above the filter drum 36 for the purpose as will be apparent later. Disposed above the filter drum is also a bracket 102 which carries a plurality of nozzles 104 connected to a water conduit 106 through a plurality of water pipes 108 and the associated valves 110 for the purpose as will be apparent hereinafter.

The arrangement thus far described is operated as follows: The electric motor 32 is energized to rotate the filter drum 36 in the direction of the arrow or in the counterclockwise direction as viewed in FIG. 6 at a predetermined fixed speed through the reduction gearing 34 while at the same time a liquid cellulose suspension from which a cellulose material is to be obtained is continuously poured into the vessel 10 through an inlet disposed on the upper lefthand side, as viewed in FIG. 6, of the vessel. Under these circumstances, that portion of the suspension adjacent that portion of the outer periphery of the filter drum 36 located in the lower position is first pulled toward the drum due to a difference between liquid pressures prevailing externally and internally of the drum respectively to allow the liquid component of the suspension to pass through both the adjacent portion of the filter cloth 64 and the adjacent perforations of the outer drum shell 38 into the associated compartments 44 to fill the latter while leaving the cellulose component of the suspension in the form of a layer or a mat M upon the filter cloth.

As the drum 36 is further rotated the cellulose mat M gradually increases in thickness while the compartments 44 filled with the liquid component or a filtrate are progressively raised. As a result, the filtrate portions filling the respective compartments 44 will flow into the individual discharge channels opening out of the compartments.

Since the compartments and the associated components are of the same type the description will now be made in terms of one of the compartments for example the particular compartment 44 shown in FIG. 6 communicating with the discharge channel 80 shown in section as having an upper open end.

When the particular compartment 44 filled with the filtrate moves above the horizontal central line passing through the rotating drum 36, the filtrate portions in both the compartment 44 and the associated discharge channel 80 tend to flow toward the discharge port 80b at the opposite end of the channel. At the beginning of the operation, that portion of the filtrate leaving the discharge port is detained in the adjacent water seal space 82 until the port is submerged in the filtrate detained in that space. This prevents air within the interior of the inner drum shell 40 from entering the discharge channel with the result that the effect of a water column provided by the filtrate portion located in the discharge channel exerts a high force of suction upon the associated portion of the outer peripheral surface of the drum. A further rotational movement of the drum to raise the compartment causes an increase in suction acting on that portion of the filtrate following the filtrate portion flowing down in the discharge channel.

The filtrate detained in the water seal space 82 leaves the latter toward the open end of the drum during rotational movement of the drum 36. At that time, however, the water seal space 82 has already been submerged in the filtrate positioned in the interior of the inner drum shell 40. Alternatively the space has begun to be submerged in that filtrate. Therefore, there is little or no liquid head between the filtrate portion in the water seal space 82 and that in the interior of the inner drum shell 40. This permits the filtrate to flow quietly and smoothly out from the water seal space 82 toward the open end of the drum 36. This smooth flow of filtrate from the water seal space submerged in the filtrate in the interior of the inner drum shell greatly contributes to the efficient separation of the filtrate as will be described hereinafter.

When the drum 36 is rotated further the particular compartment 44 concerned leaves the cellulose suspension in the vessel 10 and successively faces the nozzles 100 and 104 disposed above the latter. During this rotational movement the mat portion on and adjacent that compartment is washed first with a filtrate sprayed from the nozzles 100 and pumped from the filter box portion 92b by the pump 96 and then with clear water sprayed from the nozzles 104. After having washed and penetrated into the mat, the water enters the compartment 44 and then flows into the interior of the inner drum shell 40 through the associated discharge channel in the manner as previously described.

It is to be understood that all the compartments following the particular compartment 44 as above described operate in the same manner and those portions of mat M disposed on them are successively washed with washing liquid from nozzles 100 and 104 in the same manner as above described.

On the other hand, the effect of suction as previously described increases progressively as the filter drum 36 and therefore the compartment 44 is rotated until it reaches its maximum magnitude as the compartment 44 reaches its highest position. Thereafter the suction operation is continued during a further revolution of the compartment 44 through an angle of approximately 45 degrees measured from the highest position of the latter. In this connection, it is to be noted that the angular position at which the suction operation terminates can be controlled by properly selecting both the liquid level in the vessel 10 and the angle formed between the liquid level and the longitudinal axis of the particular discharge channel which communicate with the water seal space whose opening emerges from the liquid level. It is also to be noted that enven after the suction operation has been terminated the portion of the filtrate located in each compartment and the associated discharge channel flows down into the interior of the inner drum shell 40 by the action of gravitational force ensuring that it does not flow back into the exterior of the drum before that compartment reaches the stripping roll 84. This permits the stripping roll to be disposed at a low level as compared with the conventional type of cellulose filter apparatus with the result that the cellulose mat formed upon the filter cloth can be easily stripped from the latter.

The portion of the cellulose mat M stripped from the adjacent portion of the filter cloth 64 wrapped around the drum 36 slides down along the tilted plate 88 and the partition 82 onto the screw feeder 90.

The screw feeder 90 serves to crush the mat portion falling onto the same while feeding the crushed mat into the succeeding treating section.

Returning to FIG. 6, that portion of the filtrate discharged into the interior of the inner drum shell 40 through each water seal space 82 flows in the lefthand direction as viewed in FIG. 6 until it flows through the waste duct 22 into the filtrate box 92. In this process it is important to note that such filtrate flowing in the lefthand direction has a different concentration on one side of the partition 24 as shown in FIGS. 2, 3 and 4, than on the other side, which will be subsequently described.

As seen in FIG. 6, the portion of the filtrate passed through each of the discharge channels 80 or 82 in the early stage during each complete revolution of the drum originates from that portion of filtrate entering each compartment 44 through the adjacent portion of the filter cloth 64 and the associated perforations on the outer drum shell 38 and therefore is substantially equal in concentration to that portion of the filtrate disposed outside of the drum 36. However, the concentration of the portion of the filtrate passed through each discharge channel in the later stage decreases progressively for the reason that it has added thereto washing water sprayed from the nozzles 100 and 106 until the filtrate portion passed in the last stage through each discharge channel is nearly clear water. Therefore when the water seal space is located on the righthand side as viewed in FIGS. 6 and 7 the filtrate portion leaving the same has a higher concentration whereas the filtrate portion leaving it has a lower concentration as the water seal space is progressively moved in the lefthand direction. Thus the provision of the partition 24 in the proper position permits the exhausted filtrate to be separated into a relatively concentrated portion and a relatively diluted portion provided that the exhausted filtrate flows steadily.

This separation of the waste liquid into two portions is significant in view of the succeeding treatment, utilization of waste liquid and saving of water. More specifically, one portion of the filtrate within the exhaust space 92a having the relatively high concentration may be fed into any suitable waste treatment equipment and the like through the exhaust pipe 94 while the other portion of the filtrate within the exhaust space 92b having a relatively low concentration can be fed by the pump 96 through the pipe 98 into the nozzles 100 for spraying the cellulose mat as in the illustrated example.

From the foregoing it will be appreciated that the present invention has provided a cellulose filter apparatus operative to extract a cellulose component from a liquid cellulose suspension and wash it in a continuous manner.

The invention has several advantages. For example, the present apparatus has a very high mechanical strength and can be made in a large size because the filter drum is provided with a plurality of discharge tubes 62 substantially diametrically disposed in angularly offset relationship in the interior of the inner drum shell 40 and rigidly secured to the interior thereof. Further because the discharge tubes are manufactured only by sheet metal processing and welding techniques the costs of the materials are low and the finished drum is light. The effect of the water column provided by each of the discharge channels 78 or 80 is sufficiently utilized for the reason that the discharge tube is provided with the water seal space disposed on the end portion opening in the interior of the inner drum shell in the direction opposite to the direction of revolution of the drum. This leads to an efficient suction and filtering operation being performed over a wide angular range of each complete revolution of the drum and also to the provision of the stripping roll at its relatively low level. Therefore the invention makes possible to treat efficiently, in a continuous manner, liquid cellulose suspension from which only relatively thin celluose mats can be produced by the prior art practice. The water seal space greatly contributes to prevention of a turbulent flow of the filtrate in the interior of the inner drum shell thereby to suppress evolving of air bubbles in the flow of filtrate. This permits the flow of filtrate within the inner drum shell to be separated into concentrated and dilute portions for the purpose of using one of the two portions as washing water. Thus the amount of clear water used is greatly saved.

While the invention has been shown and described in conjunction with certain preferred embodiments thereof it is to be understood that various changes in the details of construction and the arrangement and combination of parts can be made without departing from the spirit and scope of the invention.

What I claim is:

1. A cellulose filter apparatus comprising, in combination, a vessel having an inlet and an outlet, a drive, a filter drum horizontally supported in said vessel coupled to said drive and rotatable in one direction by said drive while being partially immersed in a liquid cellulose suspension within said vessel, said filter drum having a closed end and an open end communicating with said outlet of said vessel only and composed of an outer cylindrical shell having a multiplicity of perforations therein, an inner cylindrical shell disposed coaxially within said outer cylindrical shell and defining an annular space therewith, a plurality of axial parallel partitions dividing said annular space into a plurality of longitudinal compartments, a plurality of twin discharge tubes each having a pair of parallel discharge channels therein substantially diametrically disposed in the interior of said inner cylindrical shell and each discharge channel having one end communicating with one of two diametrically opposed compartments and the other end firmly secured to the adjacent portion of the internal surface of said inner shell, the other end portion of each said discharge channel being open on that side directed in the direction opposite to the direction of rotation of said filter drum, the twin discharge tubes being disposed side by side in angularly offset relationship, a radial baffle plate projecting from the other end portion of each of said discharge channels on that side remote from said outlet of said vessel and from the adjacent portion of the internal surface of said inner shell and that portion of the internal inner shell surface facing said open end portion of said discharge channel and defining a liquid seal space communicating with said discharge channel and the interior of said inner shell, said water seal space serving to temporarily detain a filtrate passed through the associated discharge channel, said filter drum when rotated being operative to form a continuous layer of cellulose material on a sheet of filter cloth wrapped around the same by having a solid component of the suspension left on said sheet of filter cloth while permitting a liquid component of the suspension to pass through said sheet of filter cloth, said perforations on said outer shell, said compartments and the associated discharge channels and water seal spaces to said outlet of said vessel, and a stripping roll disposed adjacent the outer periphery of said filter drum to strip said layer of cellulose material from said sheet of filter cloth.

2. An apparatus as claimed in claim 1 and further comprising a plurality of nozzles disposed above and spaced along said filter drum to spray clear washing water on said layer of cellulose material.

3. An apparatus as claimed in claim 2 and further comprising a waste duct connected to said outlet of said vessel and a partition within said waste duct extending longitudinally of said filter drum to divide said waste duct into two duct portions for receiving a relatively concentrated and a relatively dilute filtrate from said water seal spaces respectively, and a further plurality of nozzles disposed above and along said filter drum and connected to the dilute filtrate waste duct portion to spray a relatively low concentration filtrate originating from said dilute filtrate duct portion onto said layer of cellulose material.

References Cited

UNITED STATES PATENTS

| 2,238,962 | 4/1951 | Young | 210—386 X |
| 2,725,145 | 11/1955 | Mylius | 210—402 |
| 3,125,514 | 3/1964 | Frykhult | 210—396 |
| 3,150,083 | 9/1964 | Luthi | 210—404 |

REUBEN FRIEDMAN, *Primary Examiner.*

J. ADEE, *Assistant Examiner.*